| (12) | United States Patent | (10) Patent No.: US 11,054,316 B2 |
|---|---|---|
| | Yoshihara | (45) Date of Patent: Jul. 6, 2021 |

(54) TEMPERATURE DETECTION DEVICE

(71) Applicant: SHIBAURA ELECTRONICS CO., LTD, Saitama (JP)

(72) Inventor: Takamasa Yoshihara, Saitama (JP)

(73) Assignee: SHIBAURA ELECTRONICS CO., LTD, Saitama (JP)

(*) Notice: Subject to any disclaimer, the term of this patent is extended or adjusted under 35 U.S.C. 154(b) by 350 days.

(21) Appl. No.: 16/305,732

(22) PCT Filed: Feb. 24, 2017

(86) PCT No.: PCT/JP2017/007133
§ 371 (c)(1),
(2) Date: Nov. 29, 2018

(87) PCT Pub. No.: WO2017/221464
PCT Pub. Date: Dec. 28, 2017

(65) Prior Publication Data
US 2020/0182708 A1    Jun. 11, 2020

(30) Foreign Application Priority Data

Jun. 23, 2016    (JP) ............................ JP2016-124851

(51) Int. Cl.
    *G01K 1/00*        (2006.01)
    *G01K 13/00*      (2021.01)
                  (Continued)

(52) U.S. Cl.
    CPC ................ *G01K 7/36* (2013.01); *G01K 1/14* (2013.01); *G01K 7/223* (2013.01)

(58) Field of Classification Search
    USPC ........................................ 374/163, 208, 152
    See application file for complete search history.

(56) References Cited

U.S. PATENT DOCUMENTS

2017/0370781 A1* 12/2017 Yoshihara .............. G01K 1/143
2018/0017446 A1* 1/2018 Yoshihara ................ G01K 1/14
(Continued)

FOREIGN PATENT DOCUMENTS

JP       55-087170 U1     12/1953
JP    2010-252508 A     11/2010
(Continued)

OTHER PUBLICATIONS

International Search Report for PCT/JP2017/007133 dated May 23, 2017.

*Primary Examiner* — Mirellys Jagan
(74) *Attorney, Agent, or Firm* — Pearne & Gordon LLP

(57) ABSTRACT

A temperature detection device includes a thermistor element that includes a thermosensitive body configured to sense heat of a coil element and an electric wire electrically connected to the thermosensitive body, and a holder assembling the thermistor element to the coil element. The holder includes a thermosensitive body holder that holds a reinforcing portion of the thermosensitive body disposed sideways along a front surface of the coil element and is provided with a first resin reservoir enclosing a thermosensitive body contact portion of the thermosensitive body, and an electric wire holder holding the electric wire. The thermosensitive body contact portion is in contact with the coil element while being enclosed with the first resin reservoir. According to the temperature detection device, it is possible to more accurately detect temperature of a coil with high responsiveness while promoting miniaturization of the temperature detection device.

18 Claims, 10 Drawing Sheets

(51) Int. Cl.
*G01K 7/00* (2006.01)
*G01K 7/36* (2006.01)
*G01K 1/14* (2021.01)
*G01K 7/22* (2006.01)

(56) References Cited

U.S. PATENT DOCUMENTS

2019/0265108 A1* 8/2019 Yoshihara ................ G01K 1/14
2019/0267871 A1* 8/2019 Yoshihara ................ G01K 1/14
2020/0393306 A1* 12/2020 Yoshihara ................ G01K 7/22

FOREIGN PATENT DOCUMENTS

| | | |
|---|---|---|
| JP | 2011254628 A | 12/2011 |
| JP | 2012057980 A | 3/2012 |
| JP | 2013-225959 A | 10/2013 |
| JP | 2016067155 A | 4/2016 |

* cited by examiner

TEMPERATURE DETECTION DEVICE

This is the National Stage of PCT international application PCT/JP2017/007133 filed on Feb. 24, 2017, which claims priority from Japanese Patent Application No. 2016-124851 filed on Jun. 23, 2016, the content of each of which is incorporated herein by reference in its entirety.

TECHNICAL FIELD

The present invention relates to a temperature detection device suitable for detecting temperature of a coil provided in a stator of a rotary electric machine.

BACKGROUND ART

In a rotary electric machine such as an electric motor, a current flows through a coil (stator coil) provided in a stator to increase temperature of the stator coil. To avoid excessive temperature increase of the stator coil to stably operate the rotary electric machine, the temperature of the stator coil is detected by a temperature sensor.

In Patent Literature 1, a bent section is provided in a neutral line that is a part of the stator coil, a case including a thermosensitive body (thermistor) is disposed in a space of the bent section, and injection molding of a resin is performed such that the resin encloses the bent section and the whole of the case, while the bent section is pressed by tools from both sides in a thickness direction. A temperature sensor is fixed to the bent section of the coil by the molded resin mold.

CITATION LIST

Patent Literature

Patent Literature 1: JP 2013-225959 A

SUMMARY OF INVENTION

Technical Problem

In the temperature detection of the stator coil, miniaturization of a structure and accurate temperature detection with high responsiveness are both constantly demanded.

According to the configuration disclosed in Patent Literature 1, the thickness is increased to upsize the structure because the coil to which the temperature sensor is attached is bent. In addition, since the thermosensitive body is built in the case, the thermosensitive body comes into contact with the coil through the case. Therefore, there is a room for improvement in sensitivity and responsiveness.

Accordingly, an object of the present invention is to provide a temperature detection device that makes it possible to more accurately detect the temperature of the coil with high responsiveness while promoting miniaturization.

Solution to Problem

A temperature detection device according to the present invention includes a temperature sensor element that includes a thermosensitive body configured to sense heat of a coil element used as a part of a coil and an electric wire electrically connected to the thermosensitive body, and a holder assembling the temperature sensor element to the coil element.

Further, in the present invention, the holder includes a thermosensitive body holder that holds a part of the thermosensitive body disposed sideways along a surface of the coil element and is provided with a first resin reservoir enclosing a thermosensitive body contact portion as another part of the thermosensitive body, and an electric wire holder holding the electric wire, and the thermosensitive body contact portion is in contact with the coil element while being enclosed with the first resin reservoir.

The temperature detection device according to the present invention preferably includes a resin mold mutually fixing the temperature sensor element, the holder, and the coil element.

In the temperature detection device according to the present invention, the thermosensitive body is preferably in contact with the coil element through a resin that is higher in thermal conductivity than the resin mold.

In the temperature detection device according to the present invention, an electric wire exposed part that is a part of the electric wire is preferably disposed between the thermosensitive body holder and the electric wire holder, and the thermosensitive body holder and the electric wire holder preferably include a second resin reservoir that encloses the electric wire exposed part.

The temperature detection device according to the present invention preferably includes a resin mold mutually fixing the temperature sensor element, the holder, and the coil element, and at least the second resin reservoir out of the first resin reservoir and the second resin reservoir is preferably a part of the resin mold.

In the temperature detection device according to the present invention, one of the thermosensitive body holder and the electric wire holder preferably includes a protrusion that protrudes toward the other holder and relatively positions the thermosensitive body holder and the electric wire holder.

In the temperature detection device according to the present invention, the electric wire holder preferably includes a partition wall that protrudes toward the thermosensitive body holder to separate the electric wire exposed part from a surface of the coil element.

In the temperature detection device according to the present invention, the thermosensitive body holder preferably includes a grip part gripping the coil element from both sides in a width direction, a holding part holding the part of the thermosensitive body disposed on the coil element, and an accommodation part that accommodates the thermosensitive body contact portion and the first resin reservoir and includes an opening communicating with outside of the thermosensitive body holder. A resin configuring the first resin reservoir is preferably filled inside the accommodation part from the opening.

In the temperature detection device according to the present invention, the accommodation part preferably extends along a direction orthogonal to or substantially orthogonal to the surface of the coil element.

In the temperature detection device according to the present invention, the electric wire preferably includes a first electric wire drawn out from the thermosensitive body and a second electric wire connected to the first electric wire, and the second electric wire is preferably inserted into the electric wire holder, and a crimping member that crimps a connection portion between the first electric wire and the second electric wire is preferably locked to the electric wire holder.

In the temperature detection device according to the present invention, the thermosensitive body preferably includes a thermosensitive main body electrically connected to the electric wire, a cover material covering the thermosensitive main body, and a reinforcing portion reinforcing a part where the electric wire is drawn out from the cover material, the reinforcing portion is preferably held as the part of the thermosensitive body by the thermosensitive body holder, and the cover material is preferably in contact with the coil element while being enclosed, as the thermosensitive body contact portion, with the first resin reservoir.

Further, according to the present invention, provided is a method of manufacturing a temperature detection device. The temperature detection device includes a temperature sensor element that includes a thermosensitive body configured to sense heat of a coil element used as a part of a coil and an electric wire electrically connected to the thermosensitive body, and a holder assembling the temperature sensor element to the coil element, and the thermosensitive body is disposed sideways along a surface of the coil element. The method includes a step of causing an electric wire holder configuring the holder to hold the electric wire, a step of causing a thermosensitive body holder configuring the holder to hold a part of the thermosensitive body, a step of providing, in the thermosensitive body holder, a resin reservoir that encloses a thermosensitive body contact portion as another part of the thermosensitive body after the part of the thermosensitive body is held by the thermosensitive body holder, and a step of bringing the thermosensitive body contact portion into contact with the coil element while the thermosensitive body contact portion is enclosed with the resin reservoir.

The method of manufacturing the temperature detection device according to the present invention preferably further includes an injection molding step of forming, by injection molding, a resin mold that mutually fixes the temperature sensor element, the holder, and the coil element. In the injection molding step, the injection molding of the resin mold is preferably performed to integrate the resin mold and the resin reservoir that has been already provided.

The method of manufacturing the temperature detection device according to the present invention preferably further includes an injection molding step of forming, by injection molding, a resin mold that mutually fixes the temperature sensor element, the holder, and the coil element. In the injection molding step, the injection molding of the resin mold is preferably performed to cause the resin mold to include the resin reservoir.

In the method of manufacturing the temperature detection device according to the present invention, the thermosensitive body holder preferably comprises an accommodation part which accommodates the thermosensitive body contact portion and includes an opening communicating with outside of the thermosensitive body holder. Preferably, the method further includes, before the injection molding step, a step of supplying a resin higher in thermal conductivity than the resin mold, to an inside of the accommodation part from the opening, and the accommodation part is provided in the thermosensitive body holder.

Advantageous Effects of Invention

According to the temperature detection device and the method of manufacturing the temperature detection device of the present invention, the thermosensitive body is disposed sideways along the coil element. This makes it possible to miniaturize the temperature detection device in a thickness direction. In addition, the thermosensitive body contact portion is in contact with the coil element without intervention of a molded product such as a holder and a case holding the thermosensitive body, between the thermosensitive body and the coil element. Therefore, it is possible to promote miniaturization of the temperature detection device by a dimension corresponding to the thickness of the molded product such as the holder and the case.

Moreover, the thermosensitive body contact portion is in direct contact with the coil element without the molded product such as the holder and the case, which causes heat to be directly conducted from the coil element to the thermosensitive body. As a result, it is possible to more accurately detect the temperature of the coil with high responsiveness, based on the heat of the coil element.

"Contact" of the thermosensitive body contact portion to the coil element includes, in addition to direct contact of the thermosensitive body contact portion to the coil element without any substance between the thermosensitive body contact portion and the surface of the coil element, indirect contact of the thermosensitive body contact portion to the surface of the coil element through a small amount of resin.

When the resin higher in thermal conductivity than air is filled in the gap between the thermosensitive body contact portion and the coil element, it is possible to improve sensitivity and responsiveness of the temperature detection, as compared with a case where a gap remains between the thermosensitive body contact portion and the coil element.

DESCRIPTION OF EMBODIMENT

An embodiment of the present invention is described below with reference to accompanying drawings.

Figure 1A:
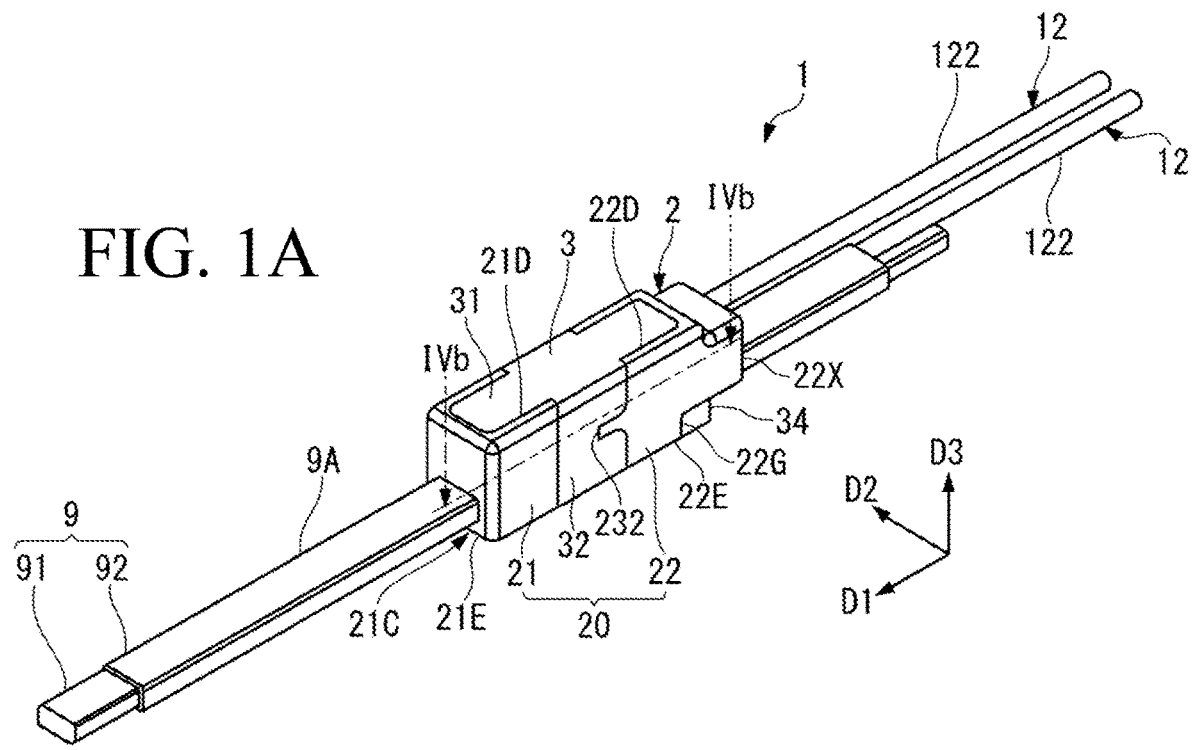
FIGS. 1A and 1B are perspective views each illustrating an appearance of a temperature detection device according to an embodiment of the present invention, FIG. 1A being a diagram as viewed from above, and FIG. 1B being a diagram as viewed from below.
Figure 1B:
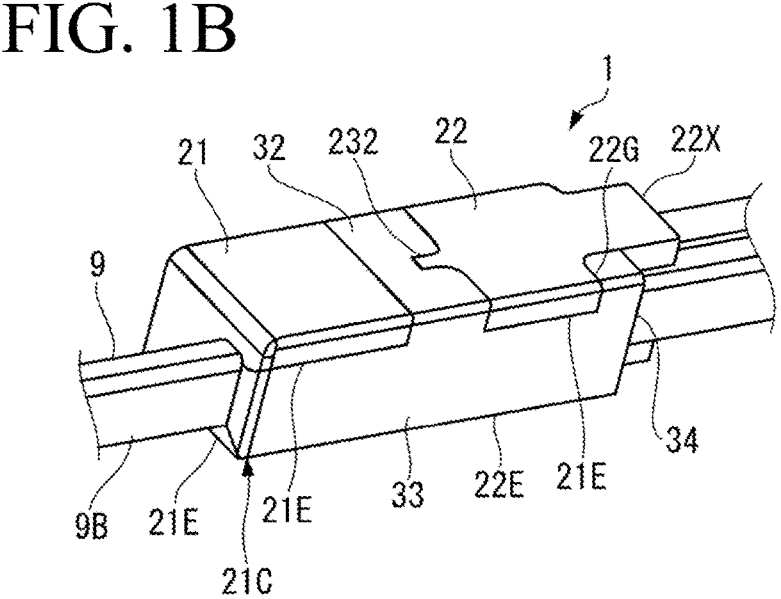

A temperature detection device 1 illustrated in FIGS. 1A and 1B includes a coil element 9 that is used as a part of a coil configuring a rotary electric machine, a sensor assembly 2 that is attached to the coil element 9, and a resin mold 3 that is a mass of injection-molded resin.

The coil including the coil element 9 configures an unillustrated stator provided in the rotary electric machine.

Temperature of the coil (stator coil) including the coil element 9 is detected based on heat of the coil element 9 that is sensed by a thermosensitive body 11 (FIG. 2 and FIG. 3) provided in the sensor assembly 2.

A configuration of the temperature detection device 1 is described.

(1) Coil Element

The coil element 9 is electrically connected to other coil elements (not illustrated) that configure the stator coil, thereby being used as a part of the stator coil.

As illustrated in FIG. 1A, the coil element 9 includes a conductor 91 through which a current flows during operation of the rotary electric machine, and an insulation film 92 that covers a surface of the conductor 91. The conductor 91 is a rectangular wire including a rectangular cross-section.

The thermosensitive body 11 (FIG. 2 and FIG. 3) of the sensor assembly 2 is in contact with a flat front surface 9A of the coil element 9.

The coil element 9 according to the present embodiment extends in one direction, and is formed in a linear shape as a whole; however, the coil element 9 may include a curved part or a bent part. In a case where the sensor assembly 2 is attached to a region including the curved or bent part, a holder 20 of the sensor assembly 2 is preferably formed in a shape following the shape of the coil element 9.

(2) Sensor Assembly

Figure 2:
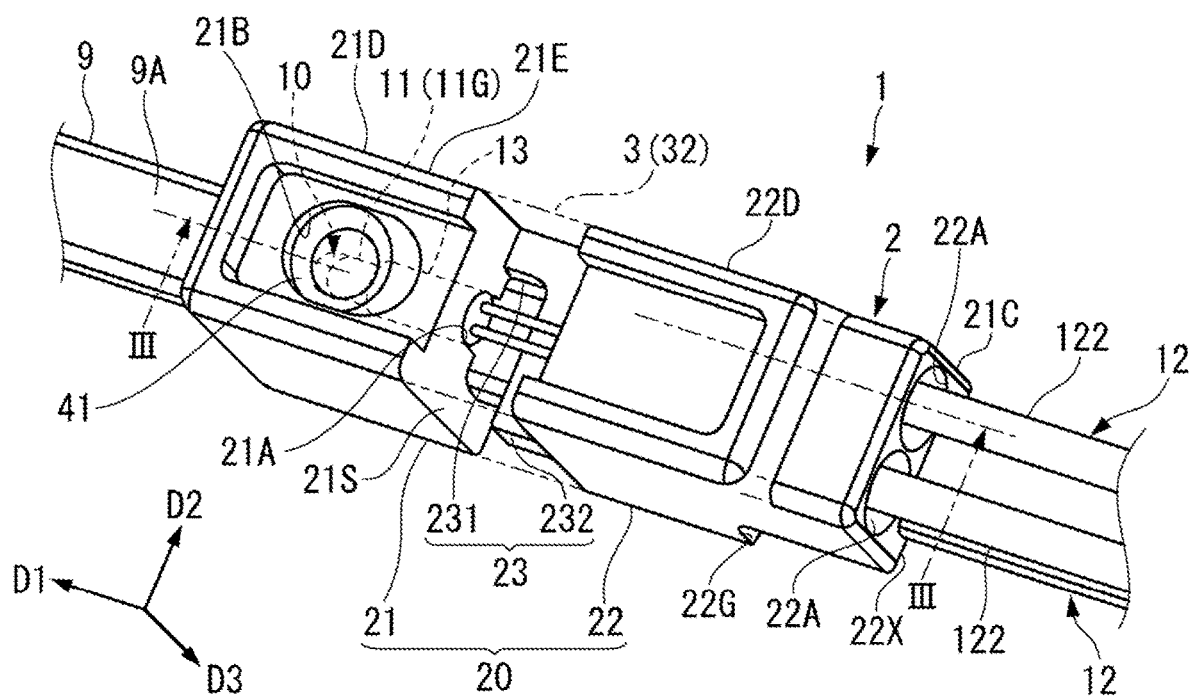
FIG. 2 is a perspective view illustrating the temperature detection device illustrated in FIG. 1 through a resin mold.
Figure 3:
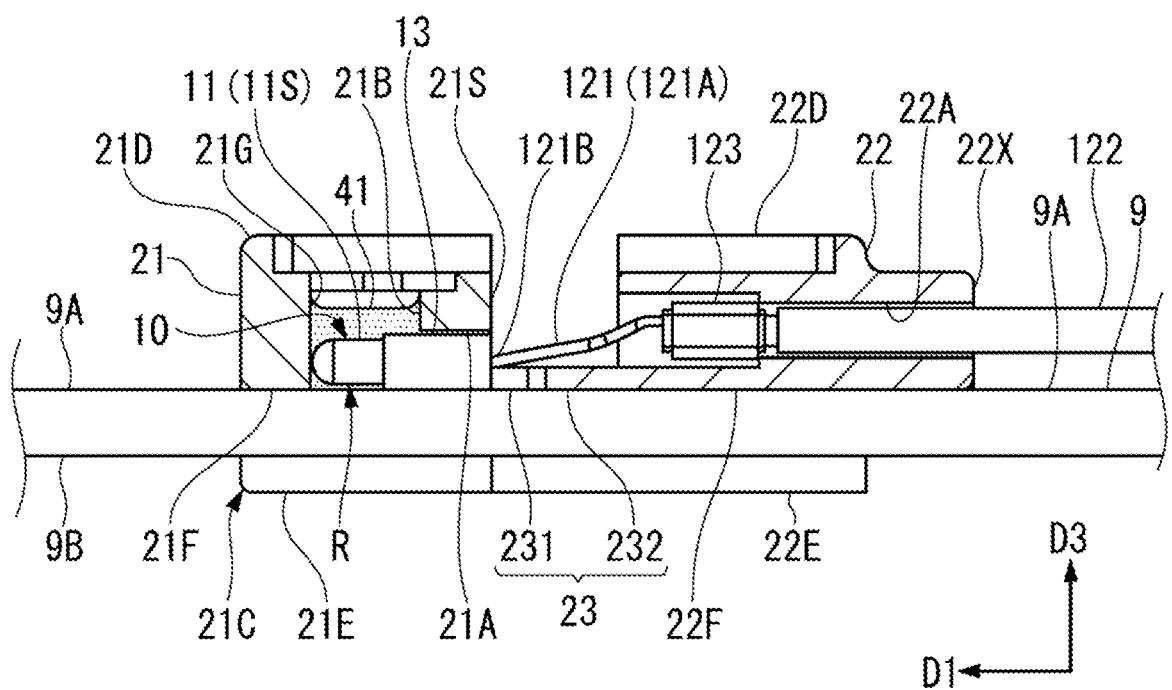
FIG. 3 is a cross-sectional view taken along a line III-III of FIG. 2.

As illustrated in FIG. 2, FIG. 3, and FIG. 1A, the sensor assembly 2 includes a thermistor element 10 that is a temperature sensor element, and the holder 20 that assembles the thermistor element 10 to the coil element 9.

A configuration of the sensor assembly 2 is described in order below.

(i) Thermistor Element

Figure 5A:
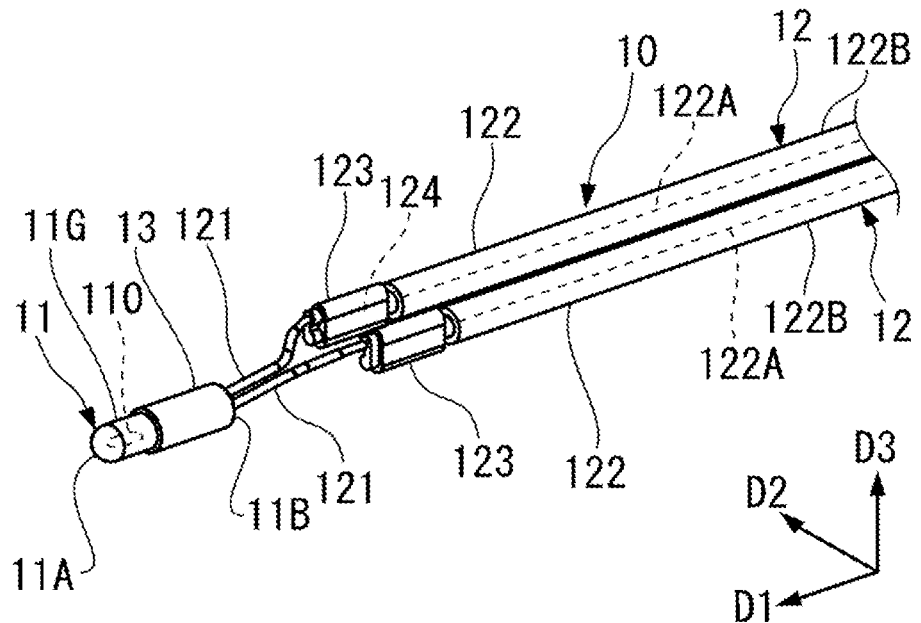
FIG. 5A is a perspective view illustrating a thermistor element.

As illustrated in FIG. 5A, the thermistor element 10 includes the thermosensitive body 11 that senses heat, and paired electric wires 12 that are drawn out from a front end 11A toward a rear end 11B of the thermosensitive body 11.

(Thermosensitive Body)

As illustrated in FIG. 5A, the thermosensitive body 11 includes a thermosensitive main body 110, a cover glass 11G (cover material) that covers the thermosensitive main body 110, and a reinforcing portion 13 that reinforces a part where the electric wires 12 are drawn out from the cover glass 11G.

The thermosensitive main body 110 is a semiconductor having electric resistance that is largely varied in response to temperature variation. The electric wires 12 are electrically connected to an unillustrated electrode provided in the thermosensitive main body 110.

The thermosensitive main body 110 may be made of ceramic that is obtained by sintering, as raw materials, some kinds of transition metal oxides mainly containing, for example, Mn, Ni, or Co.

The cover glass 11G encloses the whole of the thermosensitive main body 110 and parts of the electric wires 12 connected to the thermosensitive main body 110 without a gap. The cover glass 11G is disposed on the front surface 9A of the coil element 9 (FIG. 1A). The cover glass 11G is configured with use of amorphous glass or crystalline glass.

The cover glass 11G is wholly formed in a substantially columnar shape; however, may be formed in an appropriate shape.

(Electric Wire)

As illustrated in FIG. 5A, the paired electric wires 12 each include an extension wire 121 (first electric wire) that is connected to the thermosensitive main body 110 and is drawn out to an outside of the cover glass 11G and the reinforcing portion 13, and a lead wire 122 (second electric wire) that is connected to an end part of the extension wire 121. The lead wires 122 are connected to an unillustrated circuit substrate.

When a current flows through the coil element 9 (FIG. 1A) to increase the temperature of the coil element 9, a resistance value of the thermosensitive main body 110 that is covered with the cover glass 11G in contact with the coil element 9 is varied. The temperature is measured based on the variation of the resistance value of the thermosensitive main body 110 that is obtained through the paired electric wires 12.

The paired extension wires 121 are disposed with a predetermined interval.

A part of each of the extension wires 121 is enclosed in the cover glass 11G. Each of the extension wires 121 preferably includes a linear expansion coefficient equivalent to or close to a linear expansion coefficient of the cover glass 11G. In terms of the linear expansion coefficient, a conductive wire containing platinum or a platinum alloy, or a Dumet wire may be used as each of the extension wires 121. The Dumet wire includes a core wire that is made of an alloy containing iron and nickel, and a copper alloy film that covers the core wire.

As illustrated in FIG. 5A, each of the lead wires 122 includes a core wire 122A that is made of stainless steel, a nickel alloy, a copper alloy, or the like, and an insulation coating 122B that covers the core wire 122A.

An end part of the core wire 122A exposed from the insulation coating 122B and an end part of the corresponding extension wire 121 are connected by a method such as laser welding and electric resistance heat welding, and a connection portion 124 is crimped with a crimping member 123. The crimping member 123 covers the connection portion 124 and is squeezed from outside. The crimping member 123 is made of an appropriate metal material.

The method of connecting each of the extension wires 121 and the corresponding core wire 122A is not limited to the above-described method of welding the extension wire 121 and the core wire 122A and crimping them with the crimping member 123. The crimping member 123 is not necessarily provided, and the extension wire 121 and the core wire 122A may be connected by an appropriate method such as welding, crimping, and soldering.

To prevent leakage of the current from the coil element 9 to the electric wires 12, it is necessary to separate the electric wires 12 from the front surface 9A of the coil element 9. Therefore, as illustrated in FIG. 3, the extension wires 121 are preferably formed so as to gradually rise with respect to the front surface 9A of the coil element 9. As illustrated in FIG. 5A, the paired extension wires 121 gradually rise and the end parts of the paired extension wires 121 are connected to the core wires 122A of the lead wires 122.

(Reinforcing Portion)

The reinforcing portion 13 illustrated in FIG. 5A reinforces the parts of the extension wires 121 that are drawn out from a rear end part of the cover glass 11G, and includes a columnar shape. The reinforcing portion 13 is a member made of a ceramic material that mainly contains one or more of, for example, $Al_2O_3$, $SiO_2$, $ZrO_2$, $ZrSiO_4$, $MgO$, $Y_2O_3$, and $AlN$. The reinforcing portion 13 includes two holes through which the respective paired extension wires 121 are inserted. The reinforcing portion 13 is integrated with the thermosensitive body 11 by an appropriate method. The extension wires 121 are drawn out rearward from the reinforcing portion 13.

The thermosensitive body 11 and the extension wires 121 are reinforced by the reinforcing portion 13, which makes the thermistor element 10 strong to external force such as vibrations.

Since the reinforcing portion 13 includes sufficient rigidity, the reinforcing portion 13 is preferably pressed against the coil element 9 by a thermosensitive body holder 21 when the thermosensitive body holder 21 holds the thermosensitive body 11 to the coil element 9.

(ii) Holder

Next, as illustrated in FIG. 2 and FIG. 3, the holder 20 includes the thermosensitive body holder 21 that holds a part of the thermosensitive body 11 of the thermistor element 10, and an electric wire holder 22 that holds the electric wires 12 of the thermistor element 10. The thermosensitive body holder 21 and the electric wire holder 22 are each made of an insulating resin.

The thermosensitive body holder 21 and the electric wire holder 22 are arranged in a length direction (front-rear direction) D1 of the thermistor element 10.

When the thermistor element 10 is assembled to the coil element 9 by the thermosensitive body holder 21 and the electric wire holder 22, the thermosensitive body 11 is disposed sideways along the front surface 9A of the coil element 9, and the entire thermistor element 10 is also disposed in an attitude along an extending direction of the coil element 9 (FIG. 3).

The phrase "disposed sideways along front surface of coil element" indicates a state where the length direction D1 that connects the front end 11A (FIG. 5) of the thermosensitive body 11 and the rear end 11B (FIG. 5) of the thermosensitive body 11 from which the extension wires 121 are drawn out is parallel to or substantially parallel to the front surface 9A of the coil element 9.

(Thermosensitive Body Holder)

As illustrated in FIG. 2, the thermosensitive body holder 21 is formed in a shape surrounding the whole of the thermosensitive body 11. The thermosensitive body holder 21 includes a substantially rectangular-parallelepiped appearance.

The thermosensitive body holder 21 includes an accommodation groove 21A that accommodates the reinforcing portion 13 (FIG. 5A) as a part of the thermosensitive body 11, an accommodation hole 21B that is adjacent to the accommodation groove 21A and accommodates the cover glass 11G, a grip part 21C (FIG. 1A) that grips the coil element 9 from both sides in a width direction D2, and a bank 21D that holds the resin of the resin mold 3, illustrated by an alternate long and two short dashes line in FIG. 2.

The bank 21D is formed in a U shape (C shape) in a planar view so as to rise from a peripheral edge of a top surface part of the thermosensitive body holder 21.

The accommodation groove 21A (FIG. 2 and FIG. 4B) is recessed upward from a bottom surface (not illustrated) of the thermosensitive body holder 21 facing the front surface 9A of the coil element 9, and penetrates from the accommodation hole 21B to a rear end surface 21S of the thermosensitive body holder 21 along the length direction D1 of the thermistor element 10.

The accommodation hole 21B (FIG. 3 and FIG. 4B) penetrates through the thermosensitive body holder 21 from an upper end to a bottom part 21F at a position forward of the accommodation groove 21A. As illustrated in FIG. 3 and FIG. 4B, the accommodation hole 21B extends along a direction orthogonal to or substantially orthogonal to the front surface 9A of the coil element 9, toward the thermosensitive body 11 disposed on the coil element 9.

As illustrated in FIG. 3 and FIG. 4B, the cover glass 11G is disposed, as a thermosensitive body contact portion 11S, inside the accommodation hole 21B. A part of the reinforcing portion 13 may be disposed inside the accommodation hole 21B (FIG. 3).

As illustrated in FIG. 3 and FIG. 4B, a residual space exists inside the accommodation hole 21B in a state where the cover glass 11G is disposed inside the accommodation hole 21B. The residual space in the accommodation hole 21B is filled with a resin from an opening 21G of the accommodation hole 21B that communicates with outside of the thermosensitive body holder 21, and the resin is cured. As a result, a first resin reservoir 41 (FIG. 3 and FIG. 4A) is provided in the thermosensitive body holder 21.

As illustrated in FIG. 3, the thermosensitive body contact portion 11S is in contact with the front surface 9A of the coil element 9 while being enclosed with the first resin reservoir 41.

In the present specification, the phrase "thermosensitive body contact portion is enclosed with first resin reservoir" includes not only a configuration in which the whole of the thermosensitive body contact portion 11S is enclosed with the first resin reservoir 41 as illustrated in FIG. 3 but also a configuration in which a part (e.g., upper part) of the thermosensitive body contact portion 11S is exposed from the first resin reservoir 41.

The accommodation hole 21B is set to a size (diameter and height) with allowance so as to secure flow of the resin to enclose the thermosensitive body contact portion 11S and to cope with tolerance of the dimensions of each of the holders 21 and 22 and the thermistor element 10 (in particular, cover glass 11G).

In the present specification, "contact" of the thermosensitive body contact portion to the coil element includes, in addition to direct contact of the thermosensitive body contact portion 11S to the coil element 9 without any substance between the thermosensitive body contact portion 11S and the front surface 9A of the coil element 9, indirect contact of the thermosensitive body contact portion 11S to the front surface 9A of the coil element 9 through a small amount of resin R (FIG. 3). The resin R is a cured resin of a resin material that includes fluidity and is interposed between the thermosensitive body contact portion 11S and the coil element 9. The resin R configures a part of the first resin reservoir 41, or is provided between the thermosensitive body contact portion 11S and the coil element 9 before formation of the first resin reservoir 41, and is in close contact with the first resin reservoir 41.

The thermosensitive body contact portion 11S and the coil element 9 does not include a gap in between at a part where the thermosensitive body contact portion 11S and the coil element 9 are in contact with each other.

The thermosensitive body contact portion 11S is not necessarily in contact with the coil element 9 over the entire length, and it is sufficient that at least a part of the thermosensitive body contact portion 11S is in contact with the coil element 9.

When the thermosensitive body contact portion 11S is in contact with the coil element 9 as described above, the heat of the coil element 9 is directly conducted to the thermosensitive body 11 without intervention of surrounding gas such as air. This makes it possible to perform temperature detection by the thermistor element 10 with high sensitivity and high responsiveness.

The thermosensitive body contact portion 11S and the coil element 9 ideally come into direct contact with each other without intervention of a resin or another substance; however, the resin or the other substance may be interposed between the thermosensitive body contact portion 11S and the coil element 9 as long as the heat is directly conducted from the coil element 9 to the thermosensitive body 11.

In the case where the resin R (FIG. 3) is interposed between the thermosensitive body contact portion 11S and the coil element 9, a thickness of the resin R is sufficiently smaller than a lower limit of a thickness of a resin member formed by injection molding. The lower limit of the thickness of the resin member formed by injection molding using polyphenylene sulfide (PPS), nylon, or the like is, for example, about 0.3 mm.

To further improve heat conduction from the coil element 9 to the thermosensitive body 11 to enhance temperature measurement accuracy, thermal conductivity of the resin R is preferably high. In this respect, as the resin R, for example, an epoxy resin, silicone rubber, or heat conductive grease may be used. These resins each have thermal conductivity higher than the thermal conductivity of the resin used for the resin mold 3. In a case where the epoxy resin or the silicone rubber is used, the thermosensitive body 11 is fixed to the coil element 9 by adhesive force of the resin R. Even in a case where the resin R does not have adhesive force, the injection molding of the resin mold 3 is performed while the gap between the coil element 9 and the thermosensitive body 11 is filled with the resin R, which fixes the thermosensitive body 11 to the coil element 9.

As described later, an uncured resin is supplied to the thermosensitive body 11 and the coil element 9 through the accommodation hole 21B and is cured, which forms the first resin reservoir 41 and the resin R.

As illustrated in FIG. 1B and FIG. 3, the grip part 21C includes paired grip claws 21E that are located on a lower side of the thermosensitive body holder 21.

As illustrated in FIG. 3 and FIG. 1B, the grip claws 21E are located on respective sides of the bottom part 21F of the thermosensitive body holder 21 in the width direction D2, and are provided symmetrically about a center of the thermosensitive body holder 21 in the width direction D2.

When the coil element 9 is received in an accommodation space between the paired grip claws 21E and the bottom part 21F while the thermosensitive body holder 21 in which the thermosensitive body 11 has been accommodated in the accommodation groove 21A and the accommodation hole 21B is pressed from above, front ends of the respective grip claws 21E are locked to a rear surface 9B of the coil element 9. At this time, the reinforcing portion 13 is retained in a state of being pressed against the coil element 9 by an inner wall (holding part) of the accommodation groove 21A.

(Electric Wire Holder)

Figure 5B:
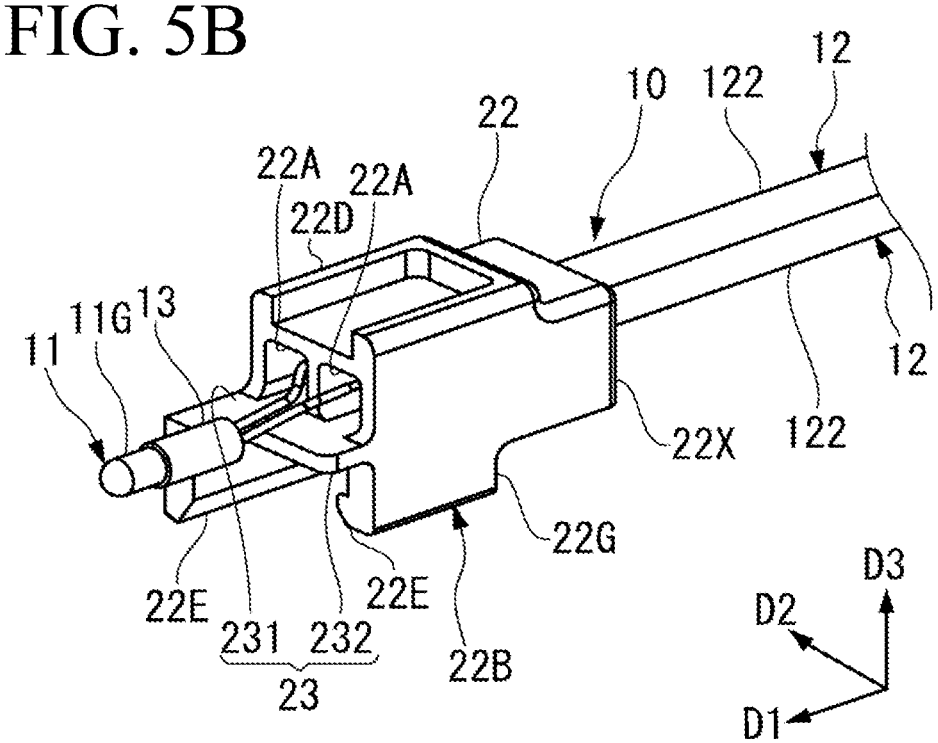
FIG. 5B is a perspective view illustrating the thermistor element and an electric wire holder.

As illustrated in FIG. 5B, the electric wire holder 22 includes insertion holes 22A through which the paired electric wires 12 extended from the thermosensitive body 11 are individually inserted, a grip part 22B that grips the coil element 9 from both sides in the width direction D2, a protrusion 23 that protrudes toward the thermosensitive body holder 21, and a bank 22D that holds the resin of the resin mold 3 (FIG. 1A).

The bank 22D is formed in a U shape (C shape) symmetrically with the bank 21D of the thermosensitive body holder 21, and the resin of the resin mold 3 is stored inside the bank 22D and the bank 21D.

As illustrated in FIG. 2, the electric wire holder 22 includes a width (dimension in D2 direction) and a height (dimension in D3 direction) equivalent to those of the thermosensitive body holder 21.

The electric wire holder 22 is disposed in series to the thermosensitive body holder 21 along the length direction D1 of the thermistor element 10.

As illustrated in FIG. 4B, the insertion holes 22A penetrate through the electric wire holder 22 from a front end surface 22S to a rear end 22X of the electric wire holder 22.

The lead wires 122 and the crimping members 123 are inserted from front openings of the respective insertion holes 22A. The lead wires 122 are drawn out from the rear end 22X of the electric wire holder 22 along the coil element 9 (FIG. 1A), and are connected to the unillustrated circuit substrate.

As illustrated in FIG. 4B, the front end sides of the insertion holes 22A serve as accommodation spaces 22C in which the crimping members 123 are accommodated. Opening areas of the respective insertion holes 22A are reduced in the height direction D3 on rear side of the accommodation spaces 22C. Therefore, the crimping members 123 disposed in the accommodation spaces 22C are locked by inner walls of the respective insertion holes 22A (FIG. 3).

Figure 4A:
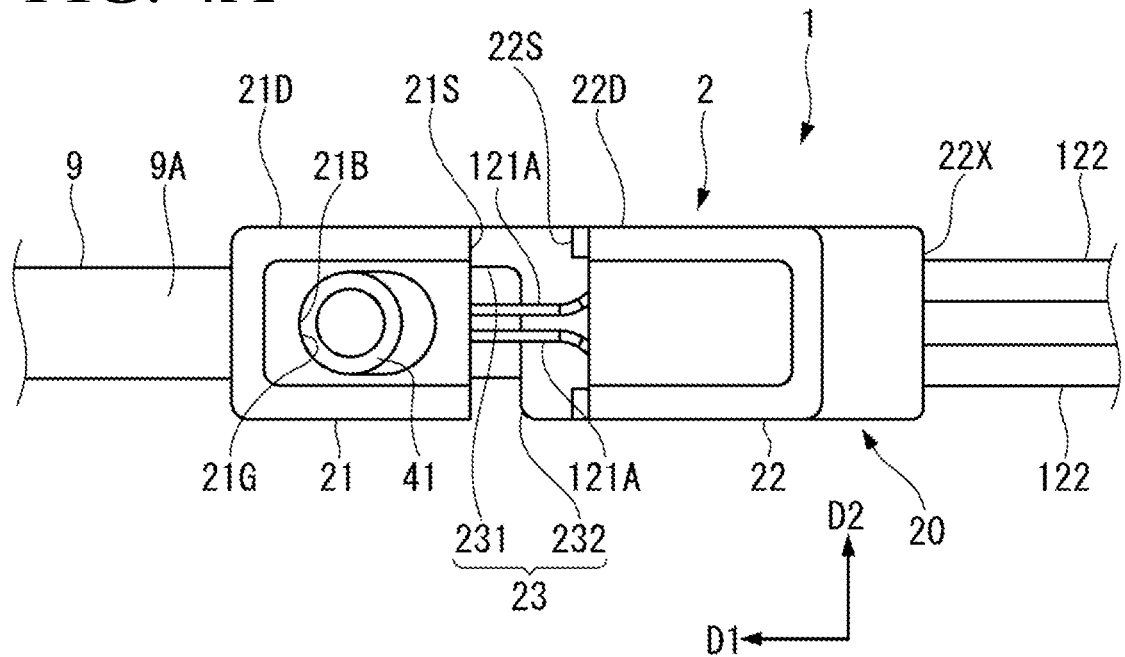
FIG. 4A is a plan view illustrating the temperature detection device in a state where the resin mold is not provided.
Figure 4B:
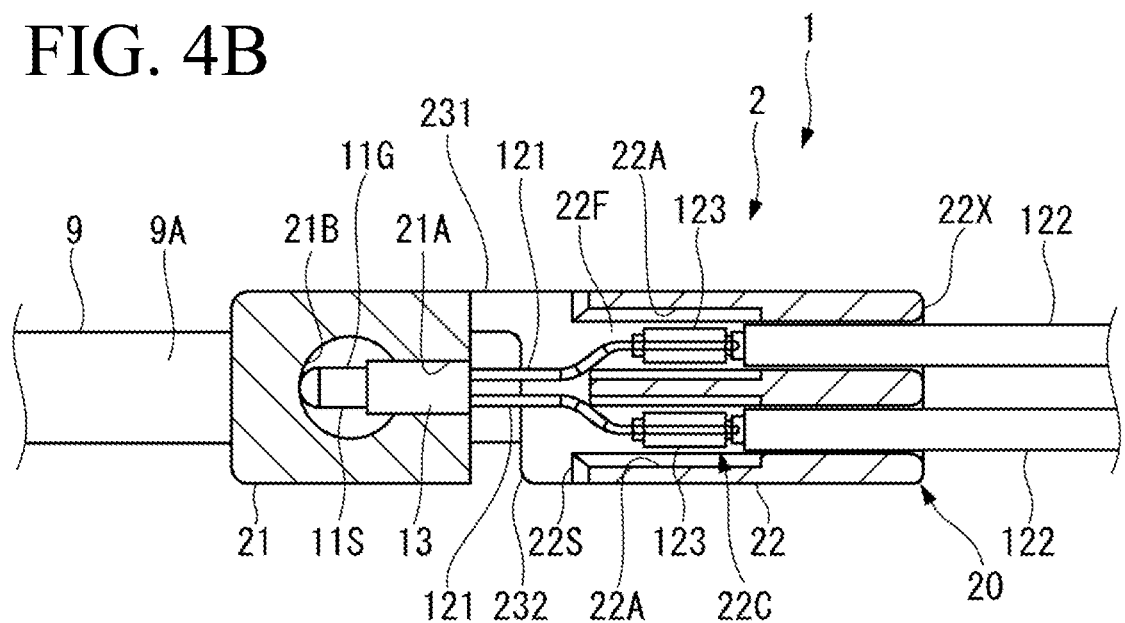
FIG. 4B is a cross-sectional view taken along a line IVb-IVb of FIG. 1A (resin mold is omitted).

As illustrated in FIG. 4A, the front end surface 22S of the electric wire holder 22 and the rear end surface 21S of the thermosensitive body holder 21 are separated from each other by a predetermined dimension. Electric wire exposed parts 121A that are parts of the extension wires 121 extended from the thermosensitive body 11 are disposed between the end surface 21S and the end surface 22S.

As illustrated in FIG. 2, a second resin reservoir 32 that encloses the electric wire exposed parts 121A is provided between the thermosensitive body holder 21 and the electric wire holder 22. The second resin reservoir 32 is obtained by curing the resin filled in the space between the thermosensitive body holder 21 and the electric wire holder 22.

The second resin reservoir 32 configures a part of the resin mold 3.

If the thermosensitive body holder 21 and the electric wire holder 22 are disposed while the gap therebetween is shortened in the length direction D1 and the extension wires 121 are accommodated in a groove or the like provided in each of the holders 21 and 22, the extension wires 121 are not exposed. To more surely achieve insulation and mechanical holding of the extension wires 121 as compared with such a configuration, the thermosensitive body holder 21 and the electric wire holder 22 are separated in the length direction D1 to expose the parts of the extension wires 121, and the exposed parts (electric wire exposed parts 121A) of the respective extension wires 121 are enclosed with the second resin reservoir 32 in the present embodiment.

The grip part 22B includes paired grip claws 22E (FIG. 5B) that are located on a lower side of the electric wire holder 22, and the bottom part 22F (FIG. 3) of the electric wire holder 22.

One of the grip claws 22E extends forward more than the other grip claw 22E illustrated on front side in FIG. 5B.

As illustrated in FIG. 1B, an anchor part 34 that is a part of the resin mold 3 is provided on rear side of the grip claws 22E.

As illustrated in FIG. 2, the protrusion 23 includes a positioning part 231 that is abutted on the end surface 21S of the thermosensitive body holder 21, and a partition wall 232 that separates the extension wires 121 and the coil element 9 from each other.

The positioning part 231 and the partition wall 232 are integrally formed in an L shape in a planar view. As illustrated in FIG. 4B, the positioning part 231 and the partition wall 232 are continuous with the bottom part 22F of the electric wire holder 22.

Note that the positioning part 231 may be provided in the thermosensitive body holder 21 so as to protrude from the thermosensitive body holder 21 toward the electric wire holder 22.

As illustrated in FIG. 4A, the positioning part 231 extends forward by a predetermined dimension beside the paired extension wires 121 that extend between the thermosensitive body holder 21 and the electric wire holder 22.

Before the second resin reservoir 32 (FIG. 2) is provided between the thermosensitive body holder 21 and the electric wire holder 22, a front end of the positioning part 231 is abutted on the end surface 21S of the thermosensitive body holder 21. As a result, the electric wire holder 22 and the thermosensitive body holder 21 are relatively positioned in the length direction D1 of the thermistor element 10.

The positioning part 231 may be formed on each of both sides of the electric wire holder 22 in the width direction D2; however, to sufficiently secure flow of the resin when the second resin reservoir 32 is provided, one of the sides of the electric wire holder 22 in the width direction D2 is preferably released without being provided with the positioning part 231.

The positioning part 231 is continuous with the one grip claw 22E that extends forward more than the other grip claw 22E, out of the grip claws 22E (FIG. 5B) located on both sides of the electric wire holder 22 in the width direction D2, and a front end of the positioning part 231 and a front end of the one grip claw 22E are abutted on the end surface 21S of the thermosensitive body holder 21. In other words, the one grip claw 22E also functions as the positioning part.

As illustrated in FIG. 3, the partition wall 232 is interposed between the front surface 9A of the coil element 9 and the extension wires 121 that are drawn out from the reinforcing portion 13 of the thermosensitive body 11 and gradually rise. The partition wall 232 separates the electric wire exposed parts 121A and the front surface 9A of the coil element 9 from each other. The presence of the partition wall 232 maintains the electric wire exposed parts 121A to be separated from the coil element 9, and sufficiently secures a distance between the front surface 9A of the coil element 9 and the electric wire exposed parts 121A. Accordingly, it is possible to prevent leakage of the current from the coil element 9 to the electric wire exposed parts 121A.

To avoid interference between roots 121B of the respective extension wires 121 drawn out from the reinforcing portion 13 and the partition wall 232, a front end of the partition wall 232 is retracted rearward from the end surface 21S of the thermosensitive body holder 21.

(3) Resin Mold

As illustrated in FIGS. 1A and 1B and FIG. 2, the resin mold 3 is formed by injection molding so as to cover a predetermined region of each of the coil element 9 and the sensor assembly 2.

As illustrated in FIG. 1A, the resin mold 3 according to the present embodiment includes an upper filling part 31, the second resin reservoir 32, a grip claw filling part 33 (FIG. 1B), and the anchor part 34. The coil element 9, the holder 20, and the thermistor element 10 are mutually fixed by the whole of the resin mold 3. Further, the resin mold 3 is provided, which makes it possible to avoid thermal influence from outside excluding the coil element 9 from being applied to the thermosensitive body 11.

The resin mold 3 is formed of an appropriate resin material such as polyphenylene sulfide (PPS) and nylon.

The upper filling part 31 (FIG. 1A) is made of a resin that has been filled inside the bank 21D and the bank 22D so as to cover the first resin reservoir 41 (FIG. 2 and FIG. 3) from above, and the first resin reservoir 41 is pressed from above by pressure of the resin in the injection molding. As a result, the thermosensitive body contact portion 11S (FIG. 3) is pressed against the front surface 9A of the coil element 9, which contributes to improvement of thermal conductivity from the coil element 9 to the thermosensitive body 11. The upper filling part 31 is cured so as to closely contact with the first resin reservoir 41, and is accordingly integrated with the first resin reservoir 41.

As described above, the second resin reservoir 32 (FIG. 1A and FIG. 2) is made of the resin that has been filled in the space between the thermosensitive body holder 21 and the electric wire holder 22, and encloses the electric wire exposed parts 121A that are exposed at the space. The second resin reservoir 32 insulates the electric wire exposed parts 121A of the paired extension wires 121 from each other, and insulates the electric wire exposed parts 121A and the coil element 9 from each other.

The grip claw filling part 33 (FIG. 1B) includes the resin filled in the space between the grip claws 21E and 21E of the thermosensitive body holder 21 and the resin filled in the space between the grip claws 22E and 22E of the electric wire holder 22.

The anchor part 34 (FIGS. 1A and 1B) is continuous to the rear side of the grip claw filling part 33, and is fitted into notched spaces 22G adjacent to the grip claws 22E. The anchor part 34 restrains the grip claw filling part 33 from being pulled out in the length direction D1 from the space between the grip claws 22E and 22E.

The anchor part 34 may be provided at an appropriate position (one or more positions) of the electric wire holder 22 without being limited to the rear end part of the electric wire holder 22. Alternatively, parts of the grip claws 21E of the thermosensitive body holder 21 may be omitted, and an anchor part similar to the anchor part 34 may be provided in the omitted parts.

[Method of Manufacturing Temperature Detection Device]

An example of a procedure of manufacturing the temperature detection device 1 is described below.

Figure 6A:
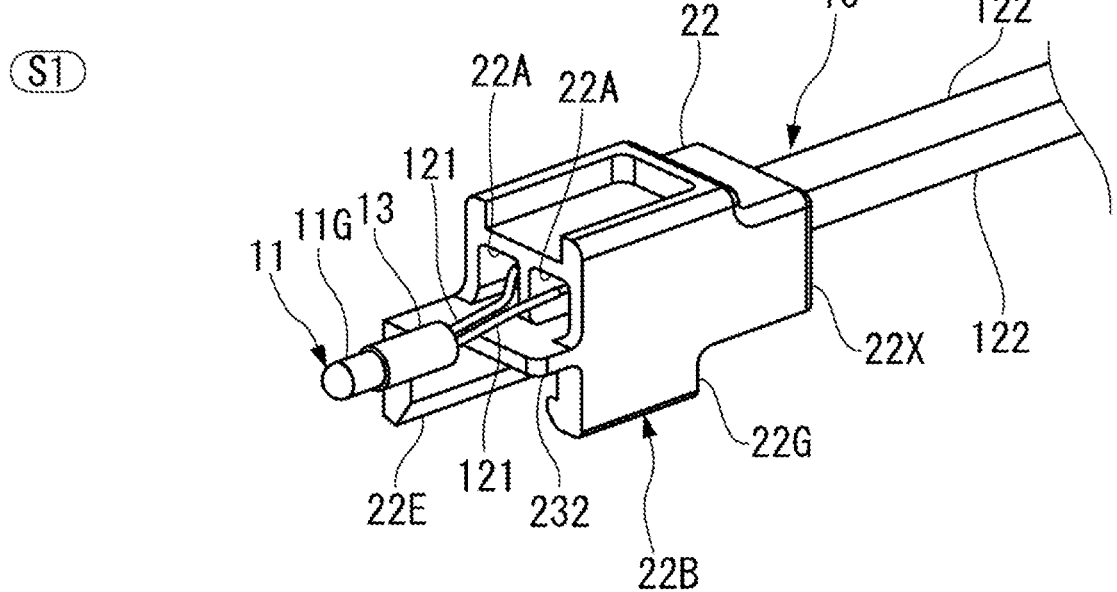
FIGS. 6A and 6B are diagrams illustrating a procedure of manufacturing the temperature detection device.

First, as illustrated in FIG. 6A, the paired lead wires 122 of the thermistor element 10 are inserted into the respective insertion holes 22A of the electric wire holder 22, to assemble the thermistor element 10 to the electric wire holder 22 (step S1). At this time, the crimping members 123 are locked inside the electric wire holder 22, which positions the thermistor element 10 with respect to the electric wire holder 22.

Figure 6B:
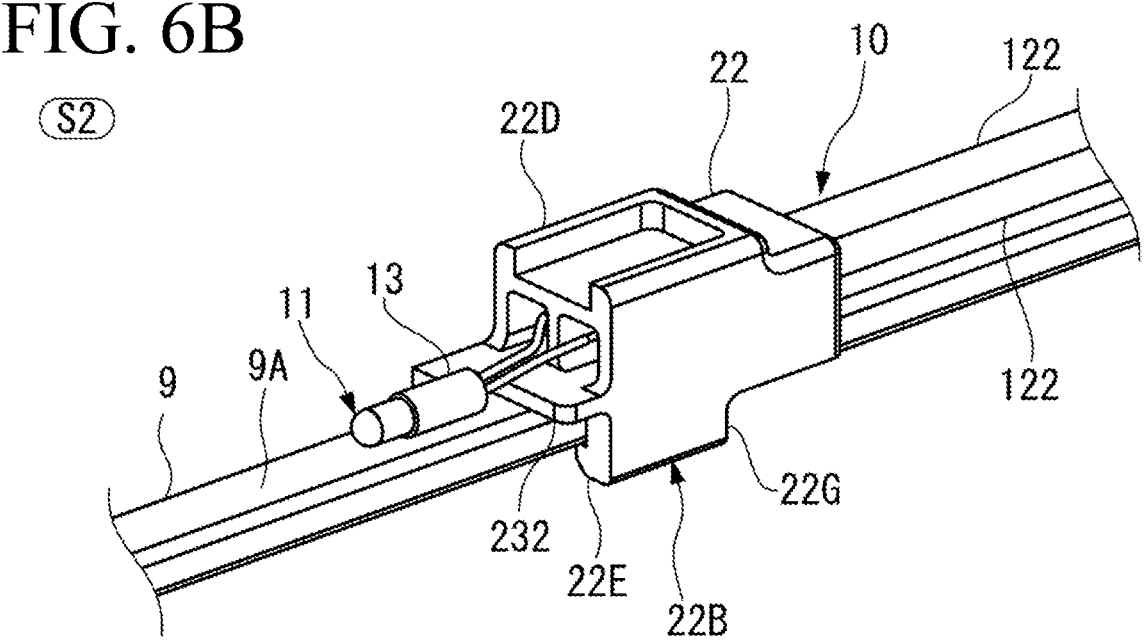

As illustrated in FIG. 6B, when the coil element 9 is fitted inside the grip part 22B of the electric wire holder 22, the thermistor element 10 and the electric wire holder 22 are assembled to the coil element 9 (step S2).

Figure 7A:
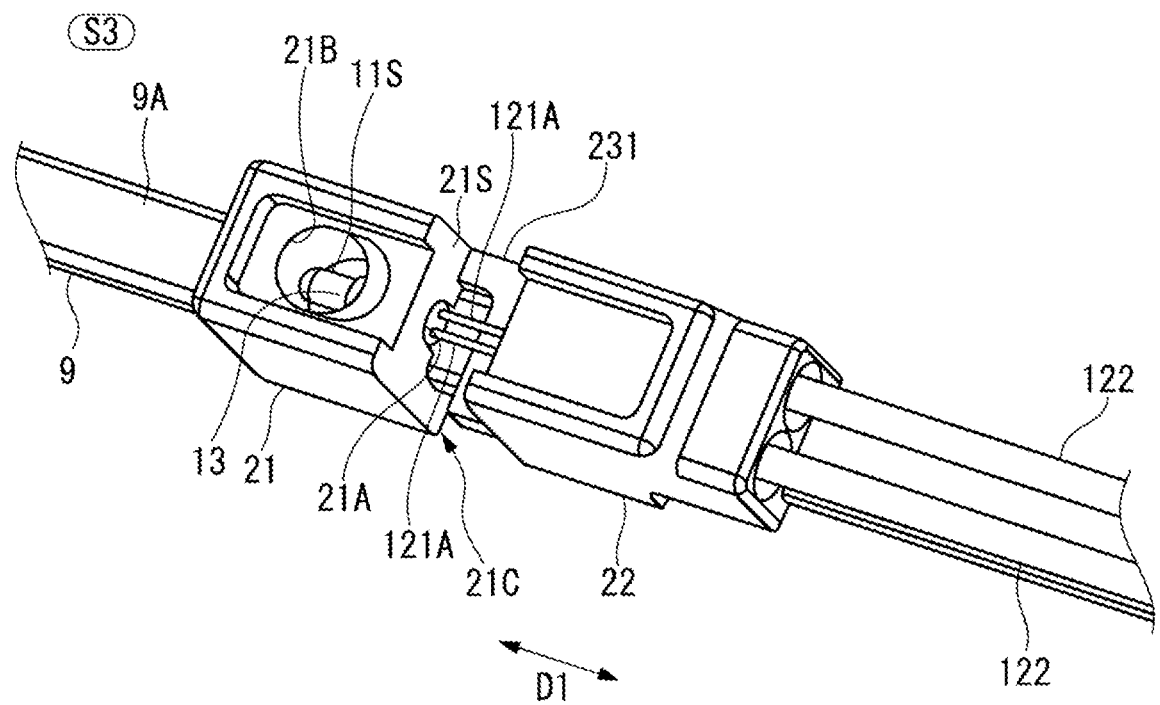
FIGS. 7A and 7B are diagrams illustrating the procedure of manufacturing the temperature detection device.

Next, as illustrated in FIG. 7A, the coil element 9 is fitted inside the grip part 21C of the thermosensitive body holder 21 while the thermosensitive body holder 21 and the electric wire holder 22 are positioned by the positioning part 231 (step S3). As a result, the reinforcing portion 13 is accommodated in the accommodation groove 21A of the thermosensitive body holder 21, and the thermosensitive body contact portion 11S is accommodated in the accommodation hole 21B as well.

At this time, the lower end of the reinforcing portion 13 that protrudes downward from the accommodation groove 21A is pressed against the front surface 9A of the coil element 9 by the inner wall of the accommodation groove 21A as the holding part. Therefore, the thermosensitive body 11 is positioned and held with respect to the coil element 9 and the thermosensitive body holder 21.

Subsequently, a resin with high thermal conductivity (e.g., epoxy resin) is supplied from the opening of the accommodation hole 21B toward the thermosensitive body contact portion 11S and the coil element 9, and is then cured (step S4).

Figure 7B:
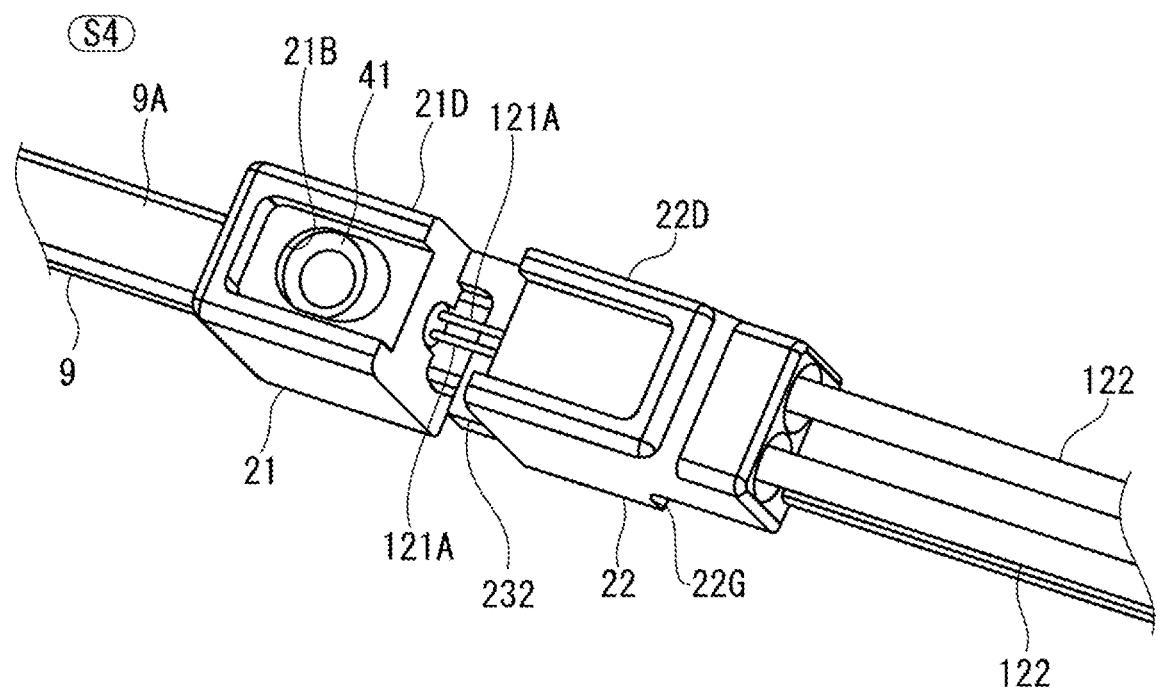

A predetermined amount of resin is supplied (potting) to form the first resin reservoir 41 in the thermosensitive body holder 21 as illustrated in FIG. 7B.

The resin supplied inside the accommodation hole 21B is stored inside the accommodation hole 21B by the inner wall of the accommodation hole 21B without flowing out to the periphery. Therefore, the resin is stored and cured inside the accommodation hole 21B.

The thermosensitive body contact portion 11S is enclosed and is fixed to the coil element 9 by the first resin reservoir 41. For example, even if a gap of a dimension corresponding to a difference between an outer diameter of the reinforcing portion 13 and an outer diameter of the thermosensitive body contact portion 11S exists between the thermosensitive body contact portion 11S and the front surface 9A of the coil element 9 before step S4, the gap is filled with a part of the resin (resin R in FIG. 3) of the first resin reservoir 41.

Steps S1 to S4 described above may be performed in an appropriate order without being limited to the above-described order as long as the thermistor element 10, the coil element 9, the thermosensitive body holder 21, and the electric wire holder 22 are assembled.

Figure 8A:
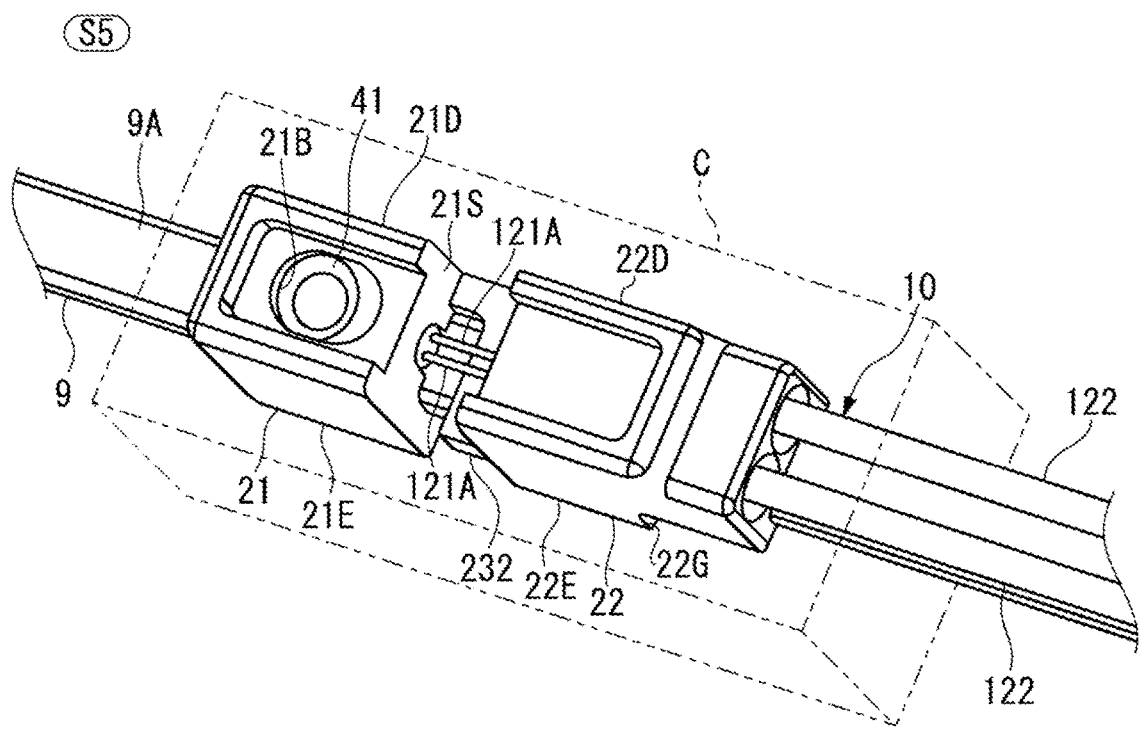
FIGS. 8A and 8B are diagrams illustrating the procedure of manufacturing the temperature detection device.

Next, as illustrated in FIG. 8A, the structure in which the coil element 9, the thermosensitive body holder 21, the electric wire holder 22, and the thermistor element 10 have been assembled is disposed inside a mold C, and a molten resin is injected into the mold C to perform injection molding of the resin mold 3 (step S5).

The molten resin is spread to a region inside the bank 21D, a region inside the bank 22D, the space between the holders 21 and 22, the space between the grip claws 21E and 21E, the space between the grip claws 22E and 22E, etc., and is cured so as to closely contact with the surface of each of the thermistor element 10, the holders 21 and 22, and the coil element 9. The thermistor element 10, the holders 21 and 22, and the coil element 9 are integrally fixed by the resin mold 3.

The resin flowing into the upper part of the first resin reservoir 41 during the injection molding is cured while pressing the first resin reservoir 41 against the coil element 9. The thermosensitive body contact portion 11S is held on the coil element 9 in a state of being enclosed with the first resin reservoir 41 and further covered with the upper filling part 31.

After the first resin reservoir 41 is provided in the thermosensitive body holder 21, the pressure of the injection-molded resin is applied to the thermosensitive body 11 through the first resin reservoir 41. As a result, the thermosensitive body 11 is moderately pressed and is brought sufficiently close to the front surface 9A of the coil element 9.

The resin flowed into the space between the thermosensitive body holder 21 and the electric wire holder 22 sufficiently enters the gap between the front end of the partition wall 232 and the end surface 21S of the thermosensitive body holder 21, and configures the second resin reservoir 32 in a state of wholly enclosing the electric wire exposed parts 121A. The electric wire exposed parts 121A are insulated from the coil element 9 by the second resin reservoir 32, and the paired electric wire exposed parts 121A are also insulated from each other by the second resin reservoir 32. Further, the electric wire exposed parts 121A are mechanically held by the second resin reservoir 32, which prevents breakage of the roots of the respective electric wire exposed parts 121A, etc.

The resin flowed into the space between the thermosensitive body holder 21 and the electric wire holder 22 is cured in a state of enclosing the partition wall 232 as well. As a result, the partition wall 232 functions as an anchor, which makes it possible to prevent the second resin reservoir 32 from being pulled out in the height direction D3 from the holders 21 and 22.

Figure 8B:
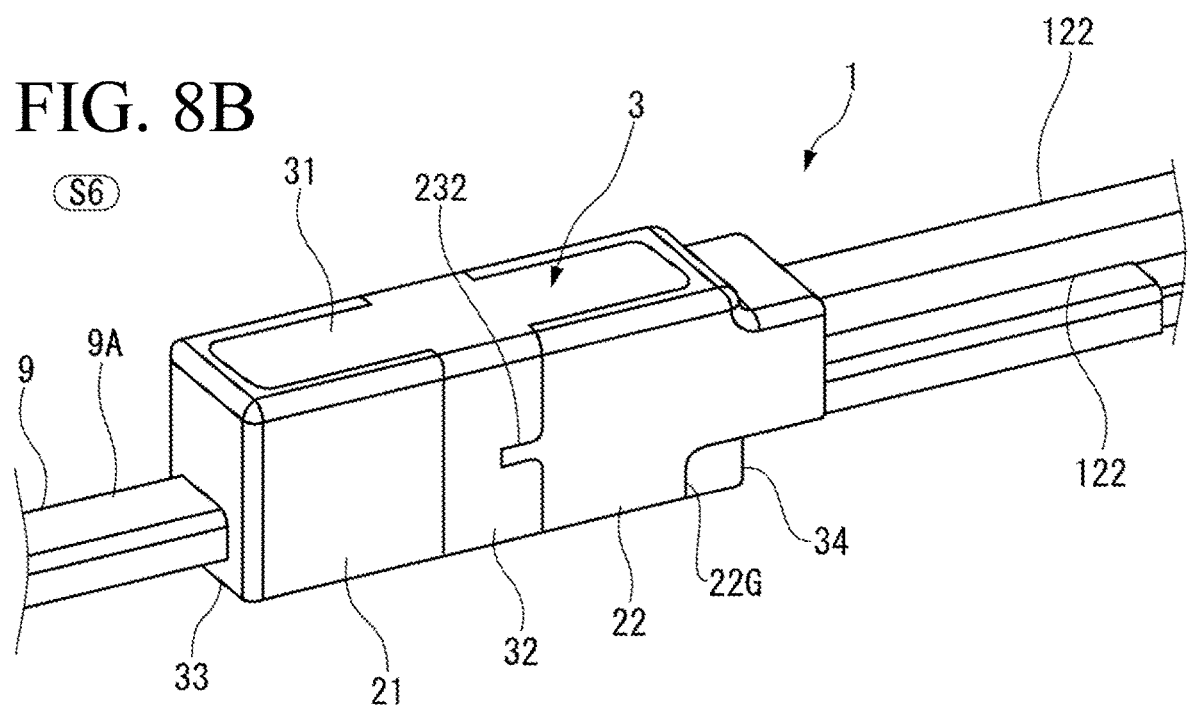

The molded resin mold 3 is separated from the mold C to obtain the temperature detection device 1 illustrated in FIG. 8B (step S6).

[Main Effects of Present Embodiment]

As illustrated in FIG. 3, in the temperature detection device 1 according to the present embodiment described above, the resin injection-molded member (e.g., part of holder) is not interposed between the thermosensitive body contact portion 11S and the front surface 9A of the coil element 9, and the thermosensitive body contact portion 11S is in contact with the coil element 9. This makes it possible to promote miniaturization of the temperature detection device 1 by a dimension corresponding to the thickness of the injection-molded product.

In addition, since the thermosensitive body 11 is disposed sideways (in lying attitude) along the coil element 9, it is possible to further miniaturize the temperature detection device 1 in a thickness direction (height direction D3) as compared with a case where the thermosensitive body 11 is erected with respect to the coil element 9.

Further, since the thermosensitive body contact portion 11S is in contact with the coil element 9 without a part of the holder 21, etc., heat is directly conducted from the coil element 9 to the thermosensitive body 11. This makes it possible to more accurately detect the temperature of the stator coil with high responsiveness, based on the heat of the coil element 9.

In the present embodiment, the reinforcing portion 13 that is a part of the thermosensitive body 11 is held to the coil element 9 by the thermosensitive body holder 21, whereas the thermosensitive body contact portion 11S is not held by the thermosensitive body holder 21 or a member previously molded with a resin. In the present embodiment, the thermosensitive body contact portion 11S is accommodated inside the accommodation hole 21B that has a capacity with allowance with respect to the size of the thermosensitive body contact portion 11S, and the thermosensitive body contact portion 11S is held to the coil element 9 while being enclosed, without a gap, by the first resin reservoir 41 that is made of the resin supplied in a flowable state.

This makes it possible to cope with fluctuation of the dimensions of each of the cover glass 11G and the thermosensitive body holder 21, and to surely bring the thermosensitive body contact portion 11S into contact with the front surface 9A of the coil element 9 while avoiding excess load from being applied to the thermosensitive body contact portion 11S. Further, since the thermosensitive body contact portion 11S is mechanically held while being enclosed with the first resin reservoir 41, it is possible to prevent breakage of the thermosensitive body contact portion 11S.

In the present embodiment, the thermosensitive body 11 is disposed sideways along the front surface 9A of the coil element 9, and the extension wires 121 are drawn out from the thermosensitive body 11 along the front surface 9A of the coil element 9. Therefore, the extension wires 121 are located close to the coil element 9. However, even if the insulation film of the front surface 9A of the coil element 9 is worn due to vibrations, etc., and the conductor of the coil element 9 is exposed, it is possible to prevent leakage of the current from the coil element 9 to the extension wires 121 because the electric wire exposed parts 121A are enclosed with the second resin reservoir 32 and are accordingly insulated. In addition, since the partition wall 232 that separates the extension wires 121 and the coil element 9 from each other secures the distance therebetween, it is possible to more sufficiently prevent leakage of the current from the coil element 9 to the extension wires 121.

Modification of Present Invention

In the above-described embodiment, the resin with high thermal conductivity that is different from the resin of the resin mold 3 is used for the first resin reservoir 41 (FIG. 3), and the first resin reservoir 41 and the resin mold 3 are integrated; however, the first resin reservoir according to the present invention may be a part of the resin mold 3. In this case, the resin is filled in the accommodation hole 21B in injection molding, and the first resin reservoir is accordingly formed together with another molded part (upper filling part 31, second resin reservoir 32, etc.).

At this time, before the injection molding, a small amount of resin (e.g., epoxy resin) may be supplied from the opening of the accommodation hole 21B, which allows the resin R (FIG. 3) to be interposed between the thermosensitive body contact portion 11S and the front surface 9A of the coil element 9. Thereafter, the injection molding may be performed to enclose the thermosensitive body contact portion 11S with the resin flowed into the accommodation hole 21B, thereby forming the first resin reservoir. As a result, the thermosensitive body contact portion 11S may be pressed against the front surface 9A of the coil element 9 by the pressure of the resin that flows into the accommodation hole 21B along a hole axis direction of the accommodation hole 21B.

To interpose the resin R between the thermosensitive body contact portion 11S and the coil element 9, the thermosensitive body contact portion 11S to which an uncured resin material has been previously adhered may be disposed on the front surface 9A of the coil element 9, instead of supply of the uncured resin material from the opening of the accommodation hole 21B in which the thermosensitive body contact portion 11S has been placed.

In the present invention, after step S3 (FIG. 7A) described above, step S5 for injection molding may be performed to form the first resin reservoir without supplying the resin inside the accommodation hole 21B. Also in this case, the thermosensitive body contact portion 11S may be pressed against the front surface 9A of the coil element 9 by the pressure of the resin used for the injection molding.

The injection molding also makes it possible to cause the resin to spread inside the accommodation hole 21B without a gap, and to form the first resin reservoir including the resin R (FIG. 3) that has entered a small gap between the thermosensitive body contact portion 11S and the coil element 9.

Figure 9:
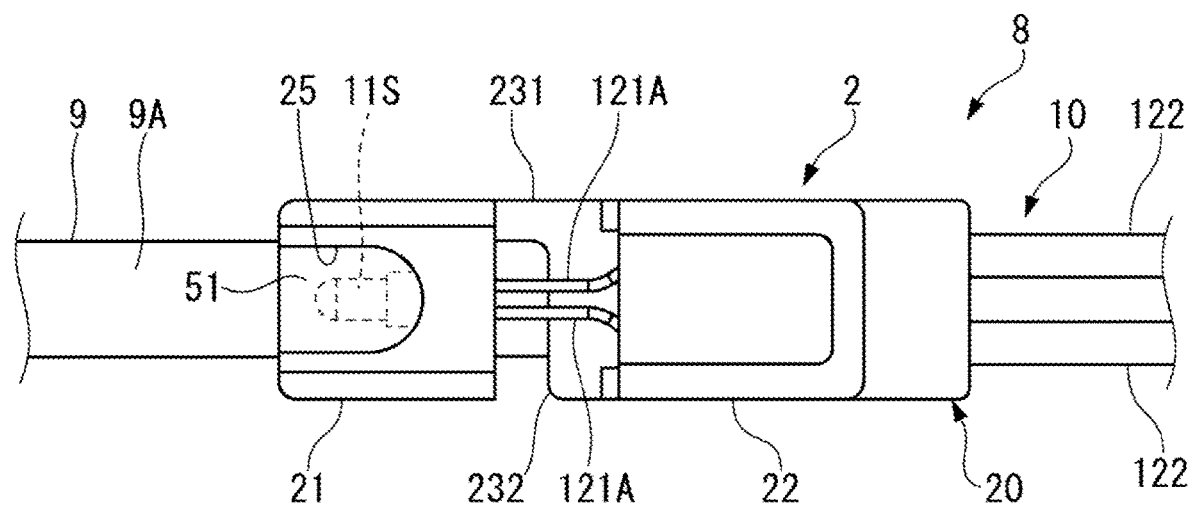
FIG. 9 is a plan view illustrating a temperature detection device according to a modification of the present invention (resin mold is omitted).

FIG. 9 illustrates a temperature detection device 8 according to a modification of the present invention. The temperature detection device 8 includes the thermistor element 10, the thermosensitive body holder 21, the electric wire holder 22, the coil element 9, and the resin mold 3 (FIG. 1 and FIG. 2) that has been formed by injection molding and is omitted in illustration in FIG. 9.

The thermosensitive body holder 21 of the temperature detection device 8 includes an accommodation part 25 that accommodates the thermosensitive body contact portion 11S. The accommodation part 25 is formed in a notched C shape in a planar view, and is open toward the front end of the thermosensitive body holder 21.

In the injection molding, the front end of the thermosensitive body holder 21 is abutted on a wall of an unillustrated mold, and the resin is filled in a space surrounded by the wall of the mold and an inner wall of the accommodation part 25. A first resin reservoir 51 is formed by the resin.

Before the injection molding, the resin with high thermal conductivity may be supplied to the inside of the accommodation part 25 to interpose the resin between the thermosensitive body contact portion 11S and the front surface 9A of the coil element 9. Further, a tool may be abutted on the front end of the thermosensitive body holder 21 to perform potting with an epoxy resin or the like inside the accommodation part 25. In this case, the first resin reservoir 51 is formed by the potting resin.

Figure 10:
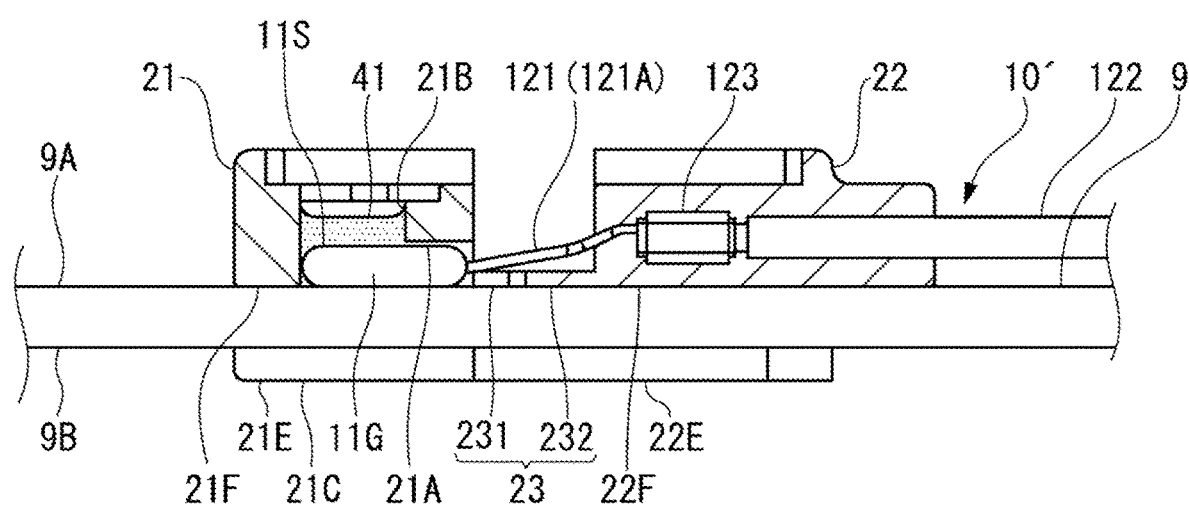
FIG. 10 is a diagram illustrating an application example to a thermistor element not including a reinforcing portion.

The present invention is applicable to a thermistor element 10' that does not include the ceramic reinforcing portion 13 (FIG. 3) as illustrated in FIG. 10. Also in FIG. 10, illustration of the resin mold 3 (FIG. 1 and FIG. 2) is omitted.

In this case, a part of the cover glass 11G is accommodated in the accommodation groove 21A, and is held and positioned. The holding and positioning are performed by the rear end part of the cover glass 11G in this example; however, the holding and positioning may be performed by the front end part of the cover glass 11G.

The other part of the cover glass 11G is disposed inside the accommodation hole 21B. The part inside the accommodation hole 21B corresponds to the thermosensitive body contact portion 11S.

The part of the cover glass 11G is accommodated in the accommodation groove 21A and the coil element 9 is gripped by the grip part 21C of the thermosensitive body holder 21 to assemble the thermosensitive body 11 to the coil element 9.

In this state, potting with the resin with high thermal conductivity may be performed inside the accommodation hole 21B to provide the first resin reservoir 41 in the thermosensitive body holder 21. Alternatively, the first resin reservoir formed by the resin filled in the accommodation hole 21B in the injection molding may be provided in the thermosensitive body holder 21.

In any case, it is possible to bring the thermosensitive body contact portion 11S into contact with the front surface 9A of the coil element 9 while enclosing the thermosensitive body contact portion 11S with the first resin reservoir.

Other than the above description, the configurations described in the above-described embodiment may be selected or may be appropriately modified without departing from the scope of the present invention.

When the holder 20 includes the thermosensitive body holder 21 and the electric wire holder 22 that are separated from each other as with the above-described embodiment, the thermistor element 10 and the coil element 9 are easily assembled to the holder 20, and flexibility is high in design that is performed in consideration of assembling easiness, etc.

The thermosensitive body holder 21 and the electric wire holder 22, however, are not necessarily formed as members separated from each other. For example, it is possible to form the holder 20 integrally including the thermosensitive body holder 21 and the electric wire holder 22 by injection molding, as long as the thermosensitive body holder 21 and the electric wire holder 22 can be separated from the mold for injection molding in one direction by changing the extending direction of the accommodation hole 21B to a direction along the length direction D1.

The resin mold 3 is not a requirement in the present invention. The resin may be dipped or applied to the structure in which the thermistor element 10, the holders 21 and 22, and the coil element 9 have been assembled, and the resin may be cured to form the first resin reservoir and the second resin reservoir, and to mutually fix the thermistor element 10, the holder 20, and the coil element 9.

REFERENCE SIGNS LIST 1, 8 Temperature detection device
2 Sensor assembly
3 Resin mold
9 Coil element
9A Front surface
9B Rear surface
10 Thermistor element (temperature sensor element)
11 Thermosensitive body
11A Front end
11B Rear end
11G Cover glass (cover material)
11S Thermosensitive body contact portion
12 Electric wire
13 Reinforcing portion
20 Holder
21 Thermosensitive body holder
21A Accommodation groove
21B Accommodation hole (accommodation part)
21C Grip part
21D Bank
21E Grip claw
21F Bottom part
21G Opening
21S End surface
22 Electric wire holder
22A Insertion hole
22B Grip part
22C Accommodation space
22D Bank
22E Grip claw
22F Bottom part
22G Space
22S End surface
22X Rear end
23 Protrusion
25 Accommodation part
31 Upper filling part
32 Second resin reservoir
33 Grip claw filling part
34 Anchor part
41 resin reservoir
91 Conductor
92 Film
110 Thermosensitive main body
121 Extension wire
121A Electric wire exposed part
121B Root
122 Lead wire
122A Core wire
122B Insulation coating
123 Crimping member
124 Connection portion
231 Positioning part
232 Partition wall
110 C Mold
D1 Length direction
D2 Width direction
D3 Height direction
R Resin

The invention claimed is:

1. A temperature detection device, comprising:
a temperature sensor element that includes a thermosensitive body configured to sense heat of a coil element used as a part of a coil and an electric wire electrically connected to the thermosensitive body;
a holder assembling the temperature sensor element to the coil element, wherein
the holder includes a thermosensitive body holder that holds a part of the thermosensitive body disposed sideways along a surface of the coil element and is provided with a first resin reservoir enclosing another part of the thermosensitive body, and
the another part of the thermosensitive body being in contact with the coil element while being enclosed with the first resin reservoir; and
a resin mold mutually fixing the temperature sensor element, the holder, and the coil element.

2. The temperature detection device according to claim 1, wherein
the thermosensitive body includes a thermosensitive main body electrically connected to the electric wire, a cover material covering the thermosensitive main body, and a reinforcing portion reinforcing a part where the electric wire is drawn out from the cover material,
the reinforcing portion is held as the part of the thermosensitive body by the thermosensitive body holder, and
the cover material is in contact with the coil element while being enclosed, as the another part of the thermosensitive body, with the first resin reservoir.

3. The temperature detection device according to claim 1, wherein the thermosensitive body is in contact with the coil element through a resin that is higher in thermal conductivity than the resin mold.

4. The temperature detection device according to claim 3, wherein
an electric wire exposed part that is a part of the electric wire is disposed between the thermosensitive body holder and an electric wire holder, and
the thermosensitive body holder and the electric wire holder include a second resin reservoir that encloses the electric wire exposed part.

5. The temperature detection device according to claim 1, wherein
the thermosensitive body holder includes a grip part gripping the coil element from both sides in a width direction, a holding part holding the part of the thermosensitive body in contact with the coil element, and an accommodation part that accommodates the another part of the thermosensitive body and the first resin reservoir, and includes an opening communicating with outside of the thermosensitive body holder, and
a resin configuring the first resin reservoir is filled inside the accommodation part from the opening.

6. The temperature detection device according to claim 5, wherein the accommodation part extends along a direction orthogonal to or substantially orthogonal to a surface of the coil element.

7. The temperature detection device according to claim 1, wherein the holder further comprises an electric wire holder holding the electric wire.

8. The temperature detection device according to claim 7, wherein
the electric wire includes a first electric wire drawn out from the thermosensitive body and a second electric wire connected to the first electric wire, the second electric wire is inserted into the electric wire holder, and a crimping member that crimps a connection portion between the first electric wire and the second electric wire is locked to the electric wire holder.

9. The temperature detection device according to claim 7, wherein
an electric wire exposed part that is a part of the electric wire is disposed between the thermosensitive body holder and the electric wire holder, and
the thermosensitive body holder and the electric wire holder include a second resin reservoir that encloses the electric wire exposed part.

10. The temperature detection device according to claim 9, wherein at least the second resin reservoir out of the first resin reservoir and the second resin reservoir is a part of the resin mold.

11. The temperature detection device according to claim 9, wherein one of the thermosensitive body holder and the electric wire holder includes a protrusion that protrudes toward the other holder and relatively positions the thermosensitive body holder and the electric wire holder.

12. The temperature detection device according to claim 9, wherein the electric wire holder includes a partition wall that protrudes toward the thermosensitive body holder to separate the electric wire exposed part from a surface of the coil element.

13. A method of manufacturing a temperature detection device, the temperature detection device including a temperature sensor element that includes a thermosensitive body configured to sense heat of a coil element used as a part of a coil and an electric wire electrically connected to the thermosensitive body, and a holder assembling the temperature sensor element to the coil element, the thermosensitive body being disposed sideways along a surface of the coil element, the method comprising:
a step of causing a thermosensitive body holder configuring the holder to hold a part of the thermosensitive body;
a step of providing, in the thermosensitive body holder, a resin reservoir that encloses another part of the thermosensitive body after the part of the thermosensitive body is held by the thermosensitive body holder;
a step of bringing the another part of the thermosensitive body into contact with the coil element while the another part of the thermosensitive body is enclosed with the resin reservoir; and
an injection molding step of forming, by injection molding, a resin mold that mutually fixes the temperature sensor element, the holder, and the coil element.

14. The method of manufacturing the temperature detection device according to claim 13, further comprising a step of causing an electric wire holder configuring the holder to hold the electric wire.

15. The method of manufacturing the temperature detection device according to claim 13, wherein in the injection molding step, the injection molding of the resin mold is performed to integrate the resin mold and the resin reservoir.

16. The method of manufacturing the temperature detection device according to claim 15, wherein
the thermosensitive body holder comprises an accommodation part which accommodates the another part of the thermosensitive body and includes an opening communicating with outside of the thermosensitive body holder, and
the method further comprises, before the injection molding step, a step of supplying a resin higher in thermal conductivity than the resin mold to an inside of the accommodation part from the opening.

17. The method of manufacturing the temperature detection device according to claim 13, wherein in the injection molding step, the injection molding of the resin mold is performed to cause the resin mold to include the resin reservoir.

18. The method of manufacturing the temperature detection device according to claim 17, wherein
the thermosensitive body holder comprises an accommodation part which accommodates the another part of the thermosensitive body and includes an opening communicating with outside of the thermosensitive body holder, and
the method further comprises, before the injection molding step, a step of supplying a resin higher in thermal conductivity than the resin mold to an inside of the accommodation part from the opening.

\* \* \* \* \*

UNITED STATES PATENT AND TRADEMARK OFFICE
CERTIFICATE OF CORRECTION

| | | |
|---|---|---|
| PATENT NO. | : 11,054,316 B2 | Page 1 of 1 |
| APPLICATION NO. | : 16/305732 | |
| DATED | : July 6, 2021 | |
| INVENTOR(S) | : Takamasa Yoshihara | |

It is certified that error appears in the above-identified patent and that said Letters Patent is hereby corrected as shown below:

In the Specification

Reference signs list, Column 17, Line 54, "41 resin reservoir" should read --41 First resin reservoir--.

Reference signs list, Column 18, Line 1, "110 C Mold" should be --C Mold--.

Signed and Sealed this
Tenth Day of May, 2022

Katherine Kelly Vidal
*Director of the United States Patent and Trademark Office*